B. DICKENSON.
DEVICE FOR PACKING HATS IN TRUNKS.
APPLICATION FILED FEB. 10, 1909.

943,919.

Patented Dec. 21, 1909.

Witnesses:
M. Gaertner.
V. Braun.

Benjamin Dickenson, Inventor
by Schreiter & Mathews
his Att'ys

UNITED STATES PATENT OFFICE.

BENJAMIN DICKENSON, OF NEW YORK, N. Y.

DEVICE FOR PACKING HATS IN TRUNKS.

943,919. Specification of Letters Patent. Patented Dec. 21, 1909.

Application filed February 10, 1909. Serial No. 477,201.

*To all whom it may concern:*

Be it known that I, BENJAMIN DICKENSON, a citizen of the United States, and a resident of the city, county, and State of New York, have invented certain new and useful Improvements in Devices for Packing Hats in Trunks, of which improvement the following is a full, clear, and exact specification, reference being had to the accompanying drawings, wherein—

Figure 1:
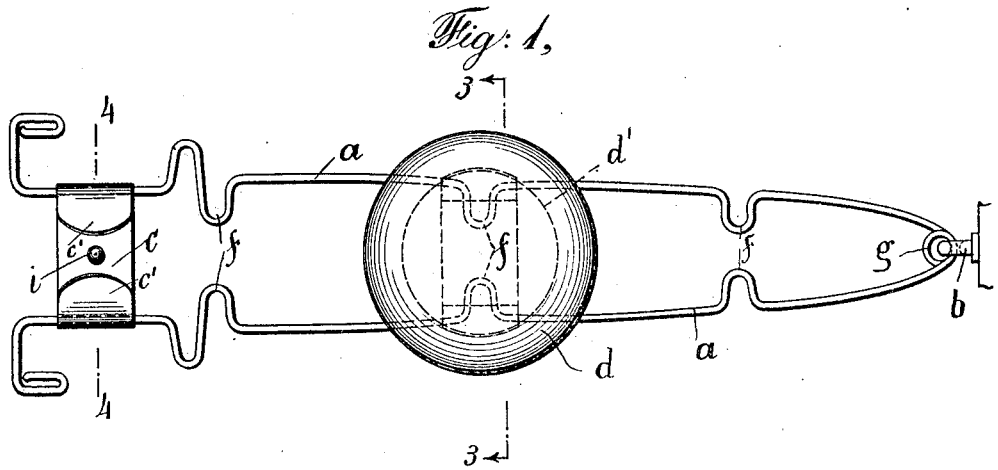
Figure 2:
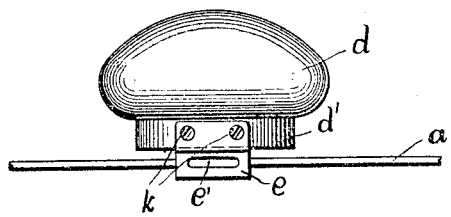
Figure 4:
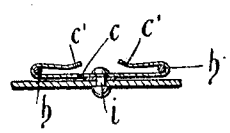
Figure 3:
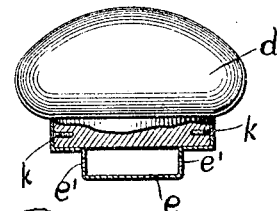

Figure 1 is an elevation of an improved device for packing hats attached to a portion of a trunk; Fig. 2 a side view thereof; Fig. 3 a sectional view on line 3—3; and Fig. 4 a sectional view on line 4—4 indicated in Fig. 1.

My invention relates to devices for packing hats in trunks, and consists of the rack proper, designated $a$ in the drawings, a fastener $b$, clamp $c$, and of one or more cushions $d$, having sockets $d'$ designed to engage with the tongues $f$ of the rack $a$ and to which cushions the hat may be attached by hat-pins or the like. The rack $a$ is composed of two arms made preferably of one piece of wire, and there is a spring coil $g$ provided in the apex of the rack, to give the arms a tendency to spread apart. The arms of the rack $a$ have formed thereon tongues $f$, located opposite each other, and shaped to enter slots $e'$ of the lugs $e$ attached to the sockets $d'$ of the hat cushions $d$ by screws $k$ as shown in Figs. 2 and 3. Instead of making the rack of spring wire in one piece and coiling the spring $g$ joining its arms in the apex, the rack can be produced of two separate arms, hinged together, and a spring set in the joint to spread the arms apart; or a coiled spring hinge may be used as a hinge, one arm of the rack being attached to each wire of the spring. The free ends of the arms of the rack $a$ are formed into handles $h$ whereby the rack is operated. Clamp $c$ is composed of a strip of metal, having the end $c'$ folded over to form recesses for the handles $h$ of the rack. This clamp $c$ is attached to the trunk by a screw or rivet $i$ wherever it is desired to provide space for packing the hats. The apex of the rack may be secured to the wall of the trunk by a screw or rivet-hook shown at $b$ in Fig. 1, or by any other suitable fastener, or a device similar to the clamp $c$ may be provided for that purpose. In place of the fastener $b$ and the clamp $c$, pieces of ordinary tape of suitable length may be provided and fastened to the wall of the box or trunk.

My improved device is used for packing hats in the following manner:—The fastener $b$ and clamp $c$ being secured in a suitable place in the trunk, the hat cushion $d$ is attached to the rack $a$ by inserting one of the tongues $f$ of one arm of the rack into the slot $e'$ of the lug $e$, and then by compressing the arms of the rack $a$ together so that the corresponding lug $f$ of the other arm enters into the other slot $e'$ on the other side of the lug. Then the rack is held in this position by the hand of the packer, pressing together handles $h$, the apex of the rack $a$ is slid on, or beneath, the fastener $b$, and finally the handles $h$ are inserted into clamp $c$. The tendency of the arms of the rack $a$ to spread apart then forces handles $h$ underneath the ends $c'$ of the clamp, and thereby the rack and the hat cushions are securely attached to the wall of the trunk. When the rack with the hat cushion is set in place, the hat is set thereon and fastened thereto by one or more hat-pins.

The object of providing more than one set of the tongues $f$ on the rack, is to enable the hat to be placed in such position as according to its size and shape is most desirable, and also to enable the hat to be packed in such position as may be desired according to the dispositions made of the other space in the trunk. It is also possible to attach more than one hat cushion to the same rack, and of course also, to pack more than one hat in the trunk on the same rack, according to their size and other conditions. My improved device may also be used in boxes to enable the packing of a number of hats into one box. For such a purpose, one or more of such devices may be employed on each wall and also on the bottom and the lid of such box. The manner of attaching the racks to the box, and of the hat cushions to the rack, is the same as described above with reference to the use of the device in trunks. In such case it will also be of great advantage to have the racks provided with a number of tongues $f$ as it is thereby made feasible to pack hats of different shapes and sizes in one box, and to arrange them so that each will have sufficient free space around it to prevent crushing.

I claim as my invention:

1. A device for packing hats, comprising a rack, composed of two arms connected by a spring, tongues formed opposite each other on each arm of the rack; a hat cushion, a lug thereon, slots in the lug in position to be engaged by the tongues of the rack, means for attaching the rack in place, and means for holding the arms of the rack together.

2. A device for packing hats, comprising a rack, composed of two arms connected by a spring, tongues formed at intervals on each arm of the rack, the tongue of each arm being located opposite the tongues on the other arm; hat cushions, having slotted lugs in position to be engaged by the tongue of the rack, means for attaching the rack in place, and means for holding the arms of the rack together.

3. A device for packing hats, comprising a two-armed rack, a spring in the joint of the arms set to spread the arms apart, tongues formed opposite each other on each arm of the rack; a hat cushion, a lug thereon, slots in the lug in position to be engaged by the tongues of the rack, means for attaching the rack in place, and means for holding the arms of the rack together.

4. A device for packing hats, comprising a two-armed rack, a spring in the joint of the arms set to spread the arms apart, tongues formed at intervals on each arm of the rack, the tongues of each arm being located opposite the tongues on the other arm; hat cushions, having slotted lugs in position to be engaged by the tongues of the rack, means for attaching the rack in place, and means for holding the arms of the rack together.

5. A device for packing hats, comprising a two-armed rack, tongues formed opposite each other on each arm of the rack; a hat cushion, a lug thereon, slots in the lug in position to be engaged by the tongues of the rack; means for attaching the rack in place at the joint of the arms, and a clamp, affixed in place and adapted to inclose and hold the free ends of the rack together.

6. A device for packing hats, comprising a two-armed rack, a spring in the joint of the arms set to spread the arms apart, tongues formed opposite each other on each arm of the rack; a hat cushion, a lug thereon, slots in the lug in position to be engaged by the tongues of the rack, means for attaching the rack in place at the joint of the arms and a clamp, affixed in place, and adapted to inclose and hold the free ends of the rack together.

BENJAMIN DICKENSON.

Witnesses:
M. A. HELMKE,
RICHARD H. JAEGER.